(12) United States Patent
Engström

(10) Patent No.: US 8,588,105 B2
(45) Date of Patent: Nov. 19, 2013

(54) METHOD FOR UPDATING INFORMATION REGARDING NETWORK NODES SERVING A TRACKING AREA

(75) Inventor: Stefan Engström, Linköping (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 393 days.

(21) Appl. No.: 12/935,951

(22) PCT Filed: Apr. 4, 2008

(86) PCT No.: PCT/SE2008/050389
§ 371 (c)(1),
(2), (4) Date: Nov. 8, 2010

(87) PCT Pub. No.: WO2009/123513
PCT Pub. Date: Oct. 8, 2009

(65) Prior Publication Data
US 2011/0170423 A1   Jul. 14, 2011

(51) Int. Cl.
*H04W 4/00* (2009.01)
*H04L 12/28* (2006.01)

(52) U.S. Cl.
USPC .......................... 370/254; 370/328; 370/389

(58) Field of Classification Search
None
See application file for complete search history.

(56) References Cited

U.S. PATENT DOCUMENTS

| | | | |
|---|---|---|---|
| 6,292,891 B1 | 9/2001 | Bergenwall et al. | |
| 2007/0104173 A1* | 5/2007 | Drevon et al. | 370/341 |
| 2008/0090593 A1 | 4/2008 | Jen | |
| 2008/0101282 A1* | 5/2008 | Ogura | 370/328 |
| 2008/0267114 A1* | 10/2008 | Mukherjee et al. | 370/315 |
| 2009/0180417 A1* | 7/2009 | Frost et al. | 370/312 |
| 2010/0190500 A1* | 7/2010 | Choi et al. | 455/436 |
| 2010/0291943 A1* | 11/2010 | Mihaly et al. | 455/450 |
| 2010/0322128 A1* | 12/2010 | Becker et al. | 370/312 |
| 2010/0329150 A1* | 12/2010 | Nielsen | 370/254 |

FOREIGN PATENT DOCUMENTS

| | | |
|---|---|---|
| EP | 1783962 A1 | 5/2007 |
| EP | 1835779 A2 | 9/2007 |
| EP | 1914929 A1 | 4/2008 |
| WO | 2007/107715 A2 | 9/2007 |
| WO | 2008/064820 A1 | 6/2008 |
| WO | 2008/122323 A2 | 10/2008 |

OTHER PUBLICATIONS

Nokia Siemens Networks et al., "Aspects for MME pool configuration updates and eNB Introduction", 3GPP TSG-RAN WG3 Meeting #59bis, Shenzhen, China, Mar. 31-Apr. 3, 2008, R3-080823, paragraph 2.1.

Nokia Siemens Networkds et al., "S1 Setup Update", 3GPP TSG-RAN WG3 Meeting #59bis, Shenzhen, China, Mar. 31-Apr. 3, 2008, R3-080828.

Ericsson, "E-UTRAN Identities", 3GPP TSG SA WG2 Architecture—S2#57, Apr. 23-27, 2007, Beijing, Republic of China, S2-071746.

* cited by examiner

*Primary Examiner* — Yemane Mesfin
*Assistant Examiner* — Christine Duong
(74) *Attorney, Agent, or Firm* — Coats and Bennett PLLC

(57) ABSTRACT

The present invention relates to a method in a radio base station (15) and a radio base station for updating information on communication network nodes (A-H) serving a tracking area (28) in which said radio base station (15) is located. The updating information is requested by sending an identity of said tracking area (28) to a communication network server (25), where after said information on said serving communication network nodes (A-H) is received from said communication network server (25).

17 Claims, 4 Drawing Sheets

METHOD FOR UPDATING INFORMATION REGARDING NETWORK NODES SERVING A TRACKING AREA

TECHNICAL FIELD

The present invention relates to a method and an arrangement in a communication network system and, more particular, to a radio base station allowing for updating information on communication network nodes serving a tracking area in which said radio base station is located as well as a method for such updating.

BACKGROUND

The demand for wireless data services, such as text messaging (SMS), multi-media messaging (MMS), mobile video and IPTV, demanding higher bandwidth is growing quickly. The third generation partnership project (3GPP) is developing the third generation mobile systems based on evolved GSM core networks and the radio access technology UMTS terrestrial radio access (UTRA) and has come up with a new orthogonal frequency division multiple access (OFDMA) based technology through the long term evolution (LTE) work which provides a very efficient wireless solution. The OFDMA based air interface is often referred to as the evolved UMTS terrestrial radio access network (EUTRAN). To support the EUTRAN a new core network, the evolved packet core (EPC) is being developed within the system architecture evolution (SAE) work. The E-UTRAN and EPC together has recently been named the evolved packet system (EPS) architecture.

In its most basic form, the EPS architecture consists of only two nodes in the user plane, the radio base station, evolved NodeB (eNB), and a core network serving gateway (S-GW). The EPS architecture further comprises a mobility management entity (MME), which performs control-plane functionality and manages mobility, user equipment (UE) identities and security parameters.

In EPS each eNB may be connected to several MMEs at the same time. Different UEs, served by the same eNB, are controlled by different MMEs. In this way the load is distributed between several MMEs by assigning UEs to different MMEs. When one MME fails, the eNB may continue operation while connected to the other MMEs. The UEs that were earlier served by the failed MME, will be served by other MMEs.

MMEs that control UEs in the same area are arranged into groups called MME Pools. An area controlled by an MME Pool is called an MME Pool Area. MME Pool Areas may overlap and the eNBs in the overlapping area, then has contact with MMEs in several MME Pools.

The eNB shall contact all MMEs in the correct pool (or pools) during deployment. The addresses to core network (CN) nodes, such as MME, is today provided to the radio access network (RAN) nodes, such as eNB, by the RAN operation and maintenance (O&M) system. These addresses are provided to the RAN O&M system by the CN O&M system or entered in the RAN O&M system by the operator in some other way. The prior art solution of updating the eNBs with information on addresser to e.g. MMEs is shown in FIG. 3, in which MME IP addresses with aliases (such as tracking areas) are stored at 31 in a domain name system (DNS) name server 25. In this example, the MME IP addresses or domain names (DN) are provided to the RAN O&M node 27 at 32 by the CN O&M node 26. Then, the MME IP addresses or DNs are provided to the eNB 15 by the RAN O&M 27 at 33. If the eNB 15 receives DNs from the RAN O&M node 27, not IP addresses, the eNB 15 need to send an MME DN to the DNS name server 25 requesting an IP address for this MME. This is illustrated with the arrow 34. As a response to the request, the DNS name server 25 sends the MME IP address back to the eNB 15 at 35.

A drawback of the prior art solution is that the IP addresses of all MMEs (or other serving nodes) must be made available in both the CN and the RAN O&M systems in order to update the eNBs of available MMEs or other serving nodes. Thus, there is need for another solution which efficiently updates eNBs of necessary information, such as IP addresses to serving nodes, as MMEs.

SUMMARY

Accordingly, one object of the present invention is to provide an improved method in a radio base station of updating information on communication network nodes serving a tracking area in which said radio base station is located.

According to a first aspect of the present invention this object is achieved through a method which specifies that information on which communication network nodes are serving communication network nodes for the tracking area that a radio base station is located in is updated by a method at the radio base station which performs the steps of: requesting updating information by sending an identity of said tracking area to a communication network server; and receiving from said communication network server said updating information on said serving communication network nodes.

Another object of the present invention is to provide an improved radio base station for updating information on communication network nodes serving a tracking area in which said radio base station is located.

According to a second aspect of the present invention this object is achieved through a radio base station that updates its information on which communication network nodes are serving communication network nodes for the tracking area in which the radio base station is located. This information is updated based on the radio base station including one or more communication interfaces that are arranged to send an identity of said tracking area to a communication network server, thereby requesting updating information on the serving communication network nodes; and to receive from said communication network server said updating information.

Further embodiments are listed in the dependent claims.

Thanks to the provision of a method and a radio base station, in which the updating of information is handled by the radio base station requesting the information, there is no need to transfer e.g. MME IP addresses or domain names between the core network O&M and the RAN O&M and no need to keep this information in the RAN O&M system.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
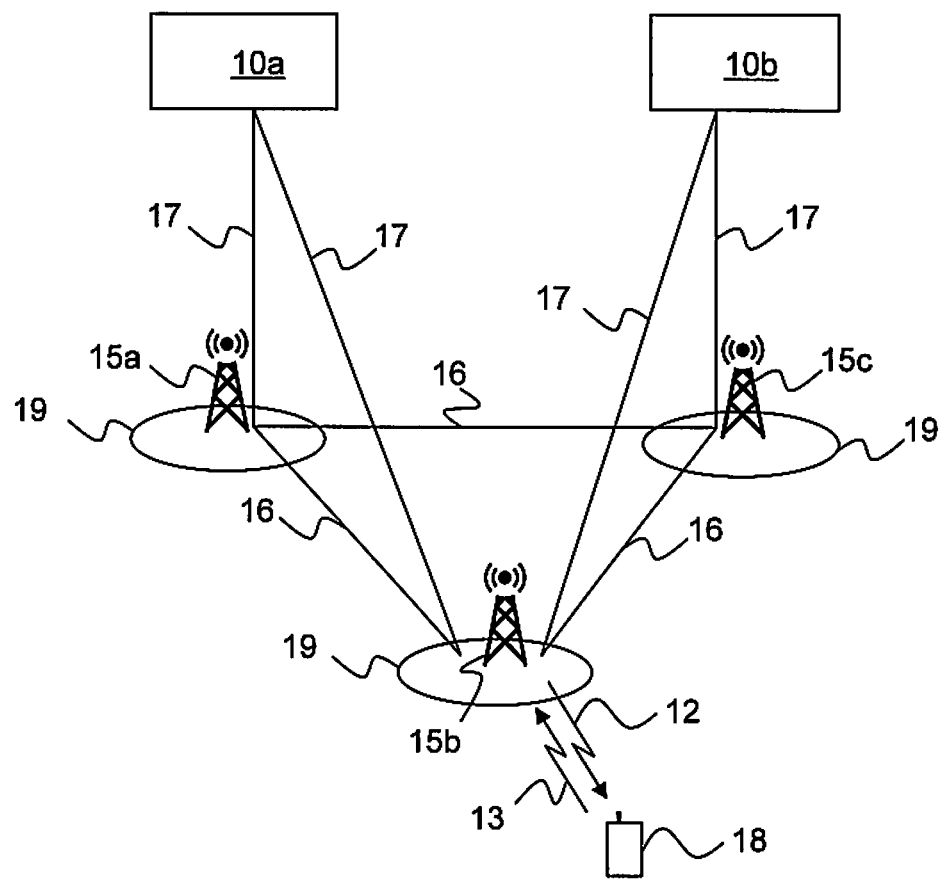
FIG. 1 shows an example of a LTE communication network architecture.

FIG. 1 depicts a communication system, including a radio access system (RAN) such as E-UTRAN, comprising at least one Radio Base Station (RBS), such as evolved Node B (eNB) 15a, 15b and 15c. The RAN is connected over an interface such as the S1-interface 17 to at least one Evolved Packet Core (EPC) network 10a and 10b, which is connected to external networks (not shown in FIG. 1) such as the Public Switched Telephone Network (PSTN) or the Integrated Services Digital Network (ISDN), and/or a connectionless external network as the Internet. Each EPC 10a and 10b comprises e.g. a Mobility Management Entity (MME) which handles control signalling for instance for mobility.

The RAN provides communication and control for a plurality of user equipments (UE) 18 (only one shown in FIG. 1) and each eNB 15a-15c is serving at least one cell 19 through and in which the UEs 18 are moving. The eNBs 15a-15c are communicating with each other over a communication interface 16, such as X2. The UEs each uses downlink (DL) channels 12 and uplink (UL) channels 13 to communicate with at least one eNB over a radio or air interface.

The user equipments 18 may be mobile stations such as mobile telephones ("cellular" telephones) and laptops with mobile termination and thus can be, for example, portable, pocket, hand-held, computer-included or car-mounted mobile devices which communicate voice and/or data with the RAN.

Figure 2:
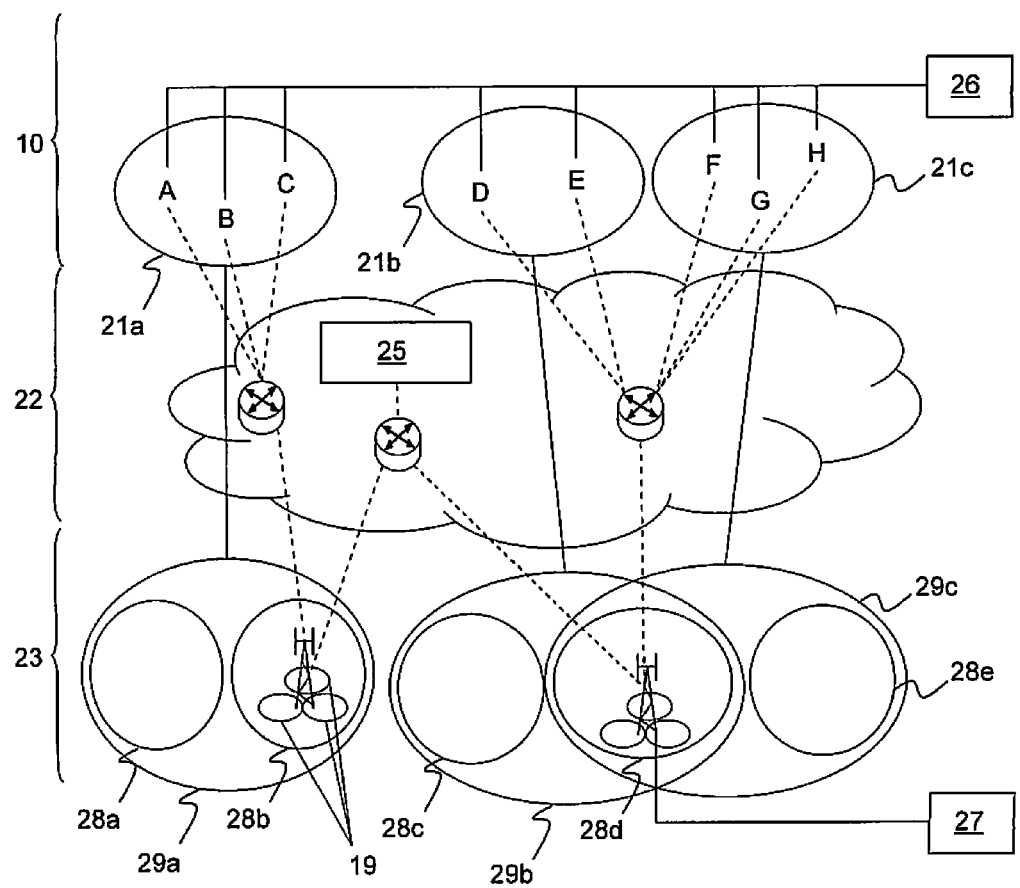
FIG. 2 shows another view of the LTE communication network architecture.
Figure 3:
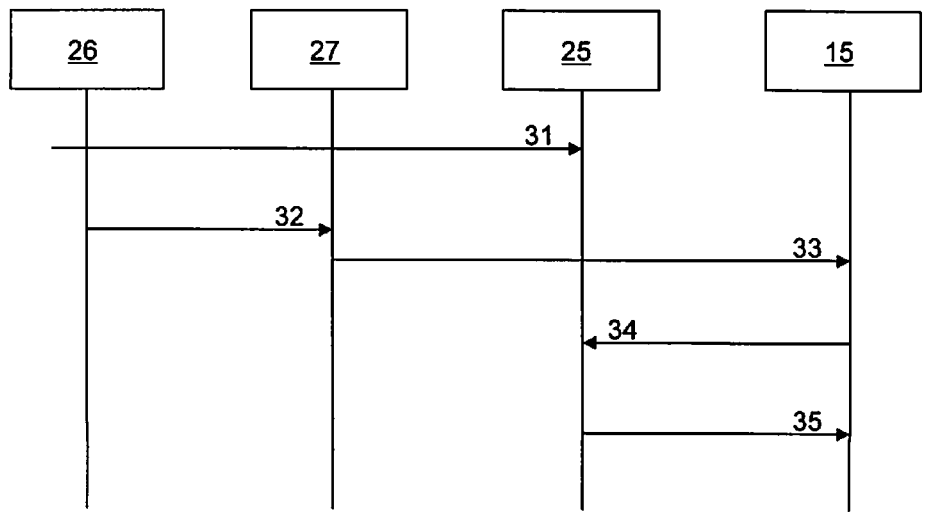
FIG. 3 shows the MME address information transfer to the radio base station according to prior art.

FIG. 2 shows another view of the LTE communication network architecture comprising the core network 10 an IP transport network 22 and the RAN 23. In the core network 10, MMEs A-H are divided into MME Pools 21a-21c. The MME is e.g. responsible for idle mode UE tracking and paging procedure including retransmissions. In FIG. 2, the first MME Pool 21a comprises three MMEs A, B and C, the second MME Pool 21b comprises two MMEs D and E and, the third MME Pool 21c comprises three MMEs F, G and H. All MMEs A-H are controlled by a CN operation and maintenance (CN O&M) node 26.

Each MME Pool 21a-21c serves an MME Pool area 29a-29c in the RAN 23. Multiple eNBs controlling cells 19 are grouped into tracking areas (TAs) 28a-28e each belonging to at least one MME Pool area 29a-29c. As can be seen from FIG. 2, MME Pool areas 29b and 29c overlap meaning that eNBs within tracking area 28d may be served by several MMEs D-H in different MME Pools 21b and 21c. Each eNB is controlled by a RAN operation and maintenance (RAN O&M) node 27.

A domain name system (DNS) name server 25 is included in the IP transport network 22. The DNS name server 25 maintains a database for resolving domain names into IP addresses and vice versa.

According to the preferred embodiment of the present invention, the eNB makes a DNS lookup on the Tracking Areas (TA), for the cells in the eNB, to find out the IP addresses for all MMEs in the MME Pools that controls these TAs. The TAs are already defined in the eNB for other purposes. The IP addresses for the TAs are already defined in the DNS Name Server e.g. because of the need for MMEs to find MMEs controlling TAs outside the own MME Pool Area.

The domain names (DN) for the TAs may be entered into the DNS Name Server as aliases for the MME Pool that handles the TA. The DN of the MME Pool then points to the IP addresses of the MMEs in the MME Pool. With this alternative the IP addresses of the MMEs do not have to be defined in the DNS Name Server for each TA but only once for each MME Pool.

When the TA is controlled by several MME Pools, the TA DN must point to the DNs of all these MME Pools, if allowed by the DNS name server, or a DN for the union of all the MME Pools controlling the TA.

According to another preferred embodiment of the present invention, the eNB makes a DNS lookup on the Tracking Areas (TA), for the cells in the eNB, to find out the IP addresses for available network time protocol (NTP) server, which is a protocol designed to synchronize the clocks of computers over a network.

Figure 4:
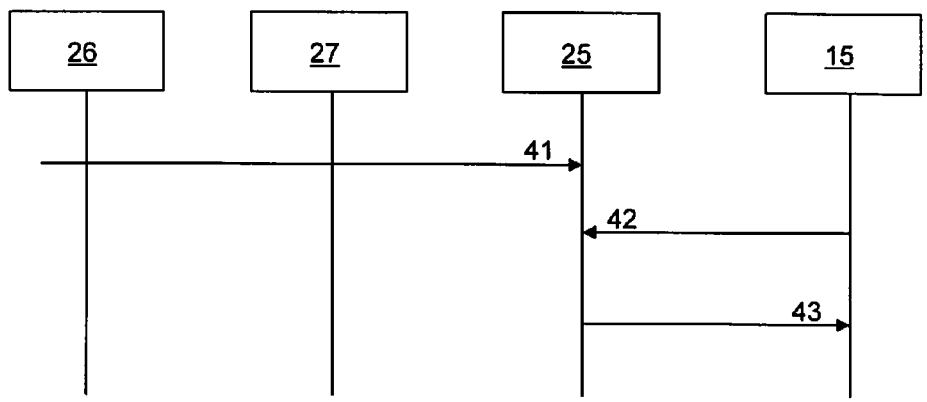
FIG. 4 shows the MME address information transfer to the radio base station according to the present invention.

A general method in a radio base station, such as eNB 15, of updating information on communication network nodes, such as MME IP addresses or NTP server IP addresses, serving a tracking area in which said radio base station is located, as shown in FIG. 4, is as follows:

requesting at 42 said updating information by sending an identity of said tracking area (i.e. a TA DN) to a communication network server, such as the DNS name server 25. The requested information is stored in the DNS name server 25 and provided from the network as illustrated with 41;

receiving at 43 from said communication network server 25 said information on said serving communication network nodes.

The identity is a domain name unique for said tracking area. More specifically, The TA is identified by the Tracking Area Identity (TAI). TAI is composed of Mobile Country Code (MCC) followed by Mobile Network Code (MNC) and Tracking Area Code (TAC) where:

MCC is 3 decimal digits,

MNC is 2 or 3 decimal digits and

TAC is supposed to be binary 3 octets (not yet standardized).

The domain name of the MMEs serving a TA may then be constructed e.g. as mme.tacAAAAAA.mncYYY.mccZZZ.3gppnetwork.org or mme.tacAAAAAA.country.operator.com.

where A is an hexadecimal digit (0-9,A-F); Y and Z are decimal digits (0-9); mme is a tag identifying the node type; tac, mnc and mcc are tags identifying the labels; 3gppnetwork is the domain reserved by 3GPP; country is the country name and operator the operator name. ASCI characters as defined by IETF must be used for the country and operator names.

If the eNB wants to find out the IP address to an NTP server, the domain name may e.g. be constructed as ntp.tacAAAAAA.mncYYY.mccZZZ.3gppnetwork.org and as response receive one or more IP addresses to NTP servers from which the eNB may obtain time signals. Thus, it is not necessary to configure each eNB with which NTP server it should contact, instead it gets the IP address to the NTP server best for an eNB in the specific TA.

This complies well with the currently specified internet domain names for 3GPP network nodes in 3GPP TS 23.003.

In the above embodiments the IP addresses of MME nodes and NTP servers are mentioned. However, the skilled person realizes that this method works very well for any node/server that is available and shall be selected based upon the location of the client.

The steps 42 and 43 are performed automatically for all eNBs 15 once the DNS name server 25 has been configured. Alternatively, the request is sent when said radio base station is firstly introduced in the communication network system or, the request is sent with a pre-determined time interval. Further, the request may be sent upon receiving an updating command message from a maintenance node, such as RAN O&M 27 or, triggered by a fault detection or other condition in said radio base station.

Figure 5:
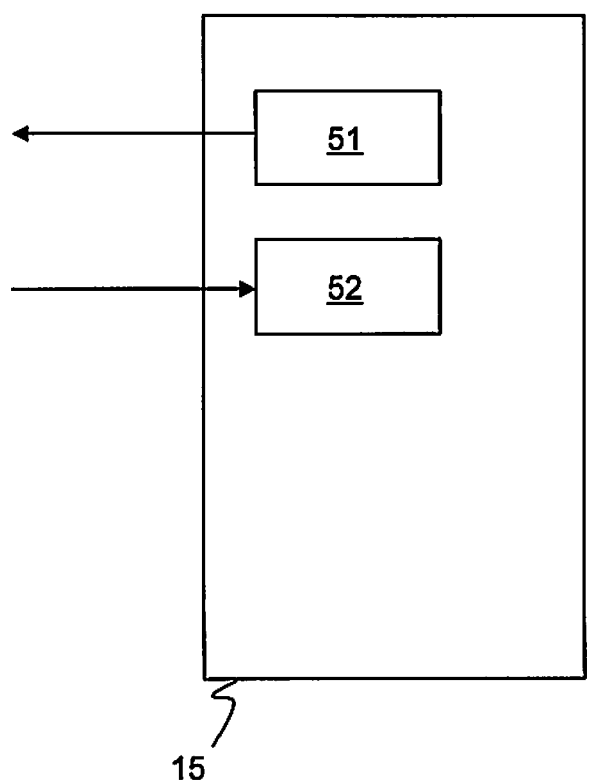
FIG. 5 shows a simplified block diagram of a radio base station according to the present invention.

FIG. 5 shows a radio base station 15, such as eNB, according to the present invention for updating information on communication network nodes serving a tracking area in which said radio base station 15 is located. The radio base station comprises among other things transmitting means 51 arranged to send an identity of said tracking area to a communication network server, thereby requesting said updating information and receiving means 52 arranged to receive from said communication network server said information on said serving communication network nodes.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method in a radio base station of updating information on a group of a plurality of communication network nodes of a given type that serve a tracking area in a communication network in which the radio base station is located, comprising:
   requesting information on each of the communication network nodes in the group serving the tracking area by sending an identity of the tracking area to a communication network server;
   receiving, from the communication network server, the requested information; and
   updating information maintained at the radio base station based on the received information;
   wherein the plurality of communication network nodes comprise a plurality of mobility management entities (MMEs) in an MME pool; and
   wherein the requested information comprises an Internet Protocol (IP) address of each of the MMEs in the (MME) pool.

2. The method of claim 1, wherein said identity is a domain name unique for said tracking area.

3. The method of claim 1, wherein the requesting information on the group of communication network nodes is performed upon the radio base station being first introduced in the communication network.

4. The method of claim 1, wherein the requesting information on the group of communication network nodes is performed according to a pre-determined time interval.

5. The method of claim 1, wherein the requesting information on the group of communication network nodes is performed when triggered by a fault detection or other condition in the radio base station.

6. The method of claim 1, wherein the requesting information on the group of communication network nodes is performed upon receiving an updating command message from a maintenance node.

7. The method of claim 1, wherein said communication network nodes comprise one or more network time protocol (NTP) servers.

8. The method of claim 1, further comprising:
   storing the requested information as an updated copy of the information maintained at the radio base station.

9. A radio base station operative to update information on a group of a plurality of communication network nodes of a given type that serve a tracking area in a communication network system in which the radio base station is located, comprising:
   one or more communication interfaces configured to:
      request information on each of the communication network nodes in the group by sending an identity of the tracking area to a communication network server; and
      receive, from the communication network server, the requested information on the serving communication network nodes; and
   one or more processing circuits configured to update information maintained at the base station based on the received information;
   wherein the plurality of communication network nodes comprise a plurality of mobility management entities (MMEs) in an MME pool; and
   wherein the requested information comprises an Internet Protocol (IP) address of each of the MMEs in the (MME) pool.

10. The radio base station of claim 9, wherein said identity is a domain name unique for said tracking area.

11. The radio base station of claim 9, wherein the one or more communication interfaces are configured to send the request upon the radio base station being first introduced in the communication network system.

12. The radio base station of claim 9, wherein the one or more communication interfaces are configured to send the request according to a pre-determined time interval.

13. The radio base station of claim 9, wherein the one or more communication interfaces are configured to send the request when triggered by a fault detection or other condition in the radio base station.

14. The radio base station of claim 9, wherein the one or more communication interfaces are configured to send the request upon receiving an updating command message from a maintenance node.

15. The radio base station of claim 9, wherein said communication network nodes comprise one or more network time protocol (NTP) servers.

16. The radio base station of claim 9, wherein said radio base station is configured to store the requested information as an updated version of the information maintained at the radio base station.

17. A method of maintaining information in a radio base station, wherein the information maps or otherwise identifies a group of a plurality of communication network nodes of given type that act as serving communication network nodes for a tracking area in a communication network in which the radio base station is located, comprising:

sending a request for the information to a communication network server that maintains a mapping of serving communication network nodes to tracking areas of the communication network, wherein the request identifies the tracking area in which the radio base station is located;

receiving the requested information from the communication network server in response to the request, the requested information comprising network addressing information corresponding to the group of serving communication network nodes for the tracking area in which the radio base station is located; and updating information maintained at the radio base station according to the requested information;

wherein the plurality of communication network nodes comprise a plurality of mobility management entities (MMEs) in an MME pool; and wherein the network addressing information comprises an Internet Protocol (IP) address of each of the MMEs in the (MME) pool.

\* \* \* \* \*